Feb. 1, 1966 D. H. BENT ETAL 3,232,548

CONTROL OF SPLICING PREPRINTED WEBS

Filed Aug. 12, 1963 2 Sheets-Sheet 1

Feb. 1, 1966 D. H. BENT ETAL 3,232,548

CONTROL OF SPLICING PREPRINTED WEBS

Filed Aug. 12, 1963 2 Sheets-Sheet 2

United States Patent Office 3,232,548

Patented Feb. 1, 1966

3,232,548

CONTROL OF SPLICING PREPRINTED WEBS

Dennis Herbert Bent, Daniel Lawrence King, Edward Thomas Astley, and Sidney Arthur Kirk, London, England, assignors to Crosfield Electronics Limited, London, England, a British company Filed Aug. 12, 1963, Ser. No. 301,344

Claims priority, application Great Britain, Aug. 15, 1962, 31,335/62

5 Claims. (Cl. 242—58.1)

Figure 1:
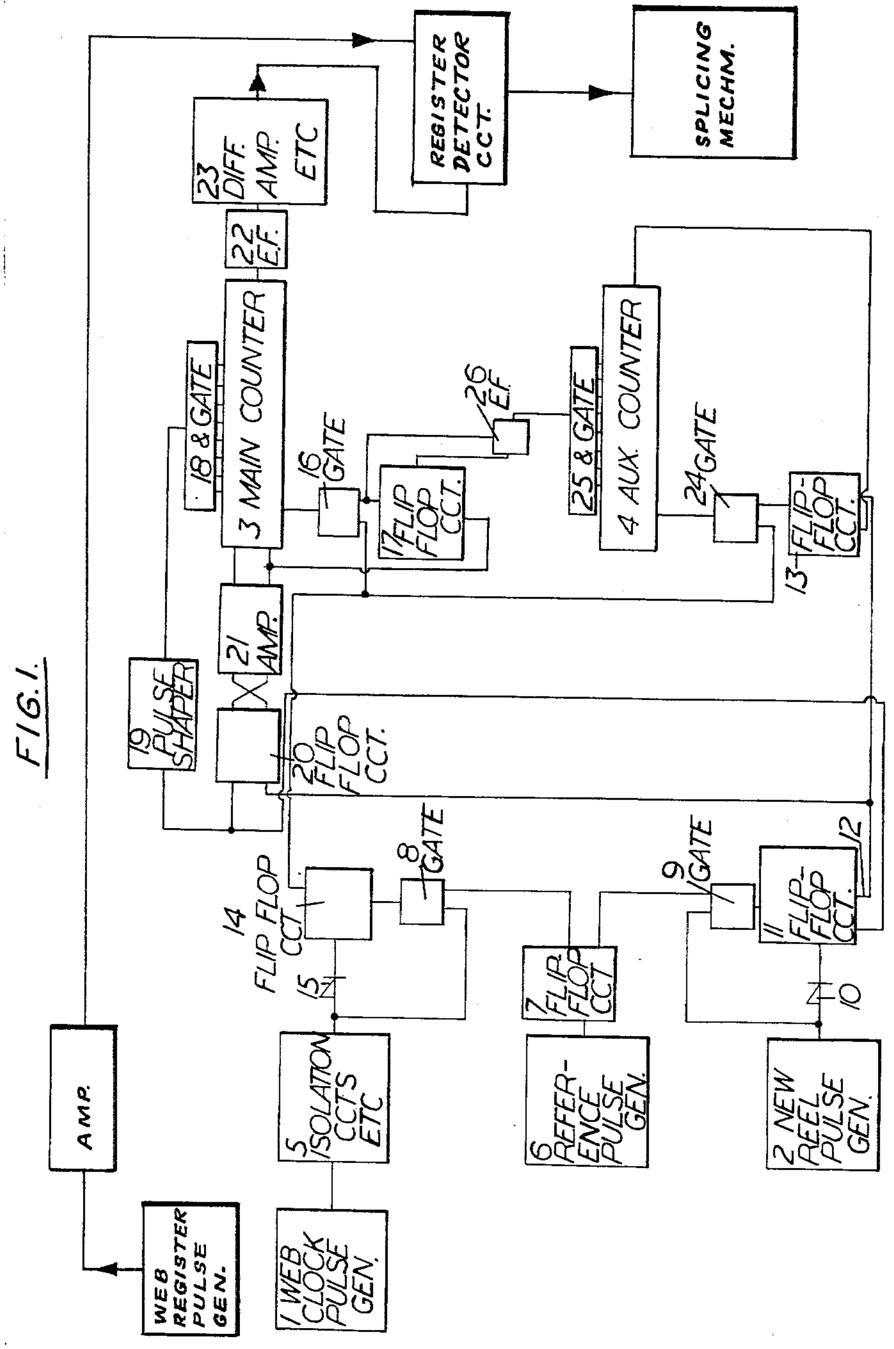

The applicants' United States Patent No. 3,042,332 described apparatus for splicing a moving web of paper carrying a repeated pattern in register to a rotating reel of paper carrying a corresponding pattern. This type of equipment can be used with any size of new reel, and relies on the fact that at each revolution of the new reel of paper there will be a jump in its register condition relative to the expiring web according to the fractional difference between the circumference of the new reel and an integral number of pattern lengths. If a suitable in-register condition is not achieved in a given time the relative speed of the new reel and expiring web is varied to alter the length of the register jump occurring each revolution.

In practice, a definite minimum time must always elapse between the instant of detection of register and the actual pasting action to allow time for the brushes and knife to be brought into position and operate. It is, therefore, necessary to be able to predict an in-register condition a predetermined time, of the order of one revolution of the new reel, in advance. As has been described in the above-mentioned application, it is possible for the operator to allow for the time required to operate the pasting and knife mechanisms by marking each new reel with a register mark which is displaced round the reel to such an extent that the register change which takes place during the time required for the pasting operation, in this case a complete revolution of the new reel, is cancelled out. However, the displacement of the register mark must be assessed individually for each new reel with reference to the preprinted patterns or by measuring the circumference of the new reel and relating this to the nearest integral number of pattern lengths around its periphery. Even then, the calculated displacement only remains correct if the peripheral speed of the new reel corresponds precisely with the velocity of the expiring web, and it has been found in practice that the speed-up mechanism fitted to reel stands introduces speed differences which cause register conditions calculated in this way to be unsatisfactory. If for example, the peripheral speed of the new reel is one percent less than the speed of the expiring web, at each revolution of the new reel the change in register will not only be dependent on the fractional difference between the circumference of the new reel and an integral number of pattern lengths, but also on the total reel circumference. A normal reel diameter is about 36 inches and, in this case, an under-speed of 1% could represent a change in register of about 1.13 inches per revolution.

As was stated in our above-mentioned patent, when the speed of the new reel is changed in such a manner that the register change per revolution is increased a correction must be introduced into the register predicting circuit, the effect of which is to increase the displacement of the mark on the reel in a direction opposite to the direction of rotation of the reel, that is effectively to provide a displacement of the register marks on the expiring web in the direction of movement of the web and it was suggested that this effect could be simulated by means of an electronic delay system. According to the present invention such a system for delaying in accordance with the speed of movement of the expiring web, the application to a register detector circuit of new reel pulses generated in response to the sensing in successive revolutions of the new reel, of a register mark on the new reel for comparison with pulses generated in response to the sensing of register marks at corresponding positions on the expiring web, includes pulse generating means adapted to operate in synchronism with the advancement of the expiring web and to emit a predetermined number of web clock pulses during the passage of each pattern length on the expiring web past a given point. Counting means are provided for counting the web clock pulses and means which are responsive to the reception of the new reel pulses trigger the counting means into operation, the counting means being so arranged that it contains an indication of the number of web clock pulses generated in the immediately preceding revolution of the new reel during the passage past the given point of the fractional pattern length on the expiring web by which the total length of the expiring web passing during the said revolution exceeds an integral number of pattern lengths. Means responsive to the said indication of the counting means are provided for generating a delayed new reel pulse for application to the register detector circuit when the number of web clock pulses received by the counting means after the reception of a new reel pulse is equal to the number of web clock pulses generated during the passage of the said fractional pattern length past the given point.

On reception of the delayed new reel pulse the register detector circuit is actuated to compare the relative register conditions of the new reel and the expiring web and if a condition predicting an "in-register" condition is detected the operation of splicing means to splice the expiring web to the rotating reel is initiated.

Figure 2:
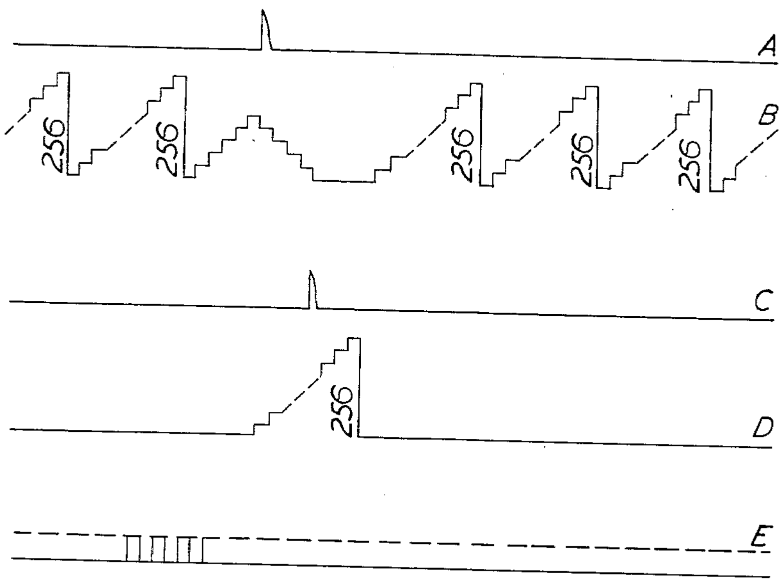

By including an electronic delay system of this type in the register prediction apparatus of a splicing mechanism it is possible to measure the change in register condition between the new reel and the expiring web dynamically at each revolution so that the prediction is independent of the size and peripheral speed of the new reel. In order that the invention may be more clearly understood a specific example of an electronic delay circuit embodying the invention suitable for inclusion in an automatic splicing mechanism such as is disclosed in our above-mentioned patent will now be described by way of example with reference to the accompanying drawings, in which:

FIGURE 1 is a block diagram showing the inter-relation of the various components of the circuit; and FIGURE 2 is a waveform diagram illustrating the operation of the delay circuit circuit shown in FIGURE 1.

A brief description of the circuit and its operation will first be given. A digital generator 1 is coupled to the printing press to which the expiring web is being fed and generates pulses from which 256 pulses are derived during the passage of each integral copy length past a given point. Reel revolution indicating pulses are generated by the generator 2 in response to the rotation of the new reel. The counting means of the circuit includes a main counter 3 and an auxiliary counter 4 each of which counts web pulses from the generator 1 and resets itself automatically to zero on reaching a count of 256 representing an integral pattern length. The main counter 3 is reversible on receiving a reel revolution indicating pulse from the generator 2 and therefore serves to count the web pulses from the generator 1 in groups of 256 until it receives a reel revolution indicating pulse from the generator 2 at which moment it will contain a count equal to the number of web pulses which have been generated during the passage past the given point during a complete revolution of the new reel of the fraction pattern length in addition to an integral number of pattern lengths. Further web pulses from the generator 1 reduce the count in the main counter 3 in unit steps as shown in line B of FIGURE 2 and the counter is arranged to generate a delayed output pulse when it has been reduced to zero. The number of web pulses required to reset the main counter in this way is equal to the number of web pulses generated during the passage in the immediately preceding reel revolution of the fractional pattern length in addition an integral number of pattern lengths and is therefore equal to the register jump which will occur in one complete revolution of the new reel at the current speed of the press. Thus the relative register condition between the new reel and the expiring web apparent to the register detector means receiving both the delayed reel revolution indicating pulse from the main counter 3 and signal representing the passage of patterns on the expiring web will be the relative register condition which will in fact exist for a complete revolution of the new reel after the next register jump between the new reel and the expiring web. If an "in register" condition is predicted by the register detector receiving these signals, a signal will be generated to initiate the splicing operation which will occur after one more revolution of the new reel.

In addition to reversing the mode of operation of the main counter 3 the reel revolution indicating pulse from the generator 2 is also employed to initiate the operation of the auxiliary counter 4. Therefore immediately after reception of a reel pulse from generator 2 both the main counter 3 and the auxiliary counter 4 count web pulses from the generator 1 in synchronism the former counting on reverse and the latter in a forward direction. When the uaxiliary counter 4 has reached a count of 256 representing the passage of an integral pattern length on the expiring web it automatically resets itself and stops and applies a pulse to restart the operation of the main counter 3 in a forward direction as shown in lines B and D of FIGURE 2 of the drawings. In this way the search for the occurrence of an "in register" condition in the next successive revolution of the new reel is started with the generation of the reel revolution indicating pulse, the auxiliary counter carrying out the function of counting pulses from the web pulse generator 1 and effectively measuring an integral pattern length on the expiring web in place of the main counter 3 while the main counter 3 operates in reverse. Therefore if the delayed reel pulse is rejected by the register detector circuit a new cycle of the delay unit is already in progress using the reel pulse which caused the reversal of the main counter as a reference. This principle of operation of the delay means of FIGURE 1 is illustrated in the waveform diagram of FIGURE 2, in which line A shows the generation of a reel revolution indicating pulse which reverses the operation of the main counter 3 as shown in line B and initiates the operation of the auxiliary counter 4 which is shown in line D. When the main counter reaches zero after counting in reverse the delayed output pulse, shown in line C, appears at the output of the delay means. From this instant the main counter 3 remains dormant until restarted by a pulse generated by the auxiliary counter 4 on reaching a count of 256 and resetting itself. Line E of the waveform diagram shows the clock pulses which are generated at a frequency of 256 per complete copy length on the web and counted by the two counters.

The actual form of the delay circuit will now be described in more detail in connection with FIGURE 1 of the drawings. The digital web pulse generator 1 comprises a generator disc which generates 256 pulses per revolution. The disc is coupled to rotate with the printing cylinder and, in an example in which there are two copy lengths per cylinder revolution, it can conveniently be coupled in an 1:1 ratio so that the disc generates 256 pulses per two copy lengths of the web. To obtain the required degree of accuracy of one pulse per length .1 inch of paper travel for a 24 inch copy length it is necessary to double the frequency of the generated wavetrain. This is done by feeding the output signal of the web pulse generator 1 to a number of conventional circuits indicated by the block 5 in FIGURE 1, including a full wave diode bridge rectifier to which the pulses are applied via an isolating transformer.

There is some degree of envelope modulation in the output wave of the generator 1 and therefore the rectified wave is clipped and re-amplified in a well known manner before being differentiated and squared to provide a signal at the output of the combination of conventional circuits 5 which comprises a train of web clock pulses at a frequency of 256 per copy length.

In order to ensure that the main counter 3 has sufficient time to reverse after receiving a reel revolution indicating pulse from the generator 2 before receiving a further web clock pulse from the output of the cicuit 5 it is necessary to arrange that the interval between application of a web clock pulse and a reel revolution indicating pulse is never less than about 60 microseconds. This function is performed by a pulse sharing circuit which will now be described. A Schmitt trigger circuit 6 with a power output transistor and a positive output to input feedback connection functions as a square wave oscillator providing an output signal of frequency of 10 kilocycles per second, that is with a period of 100 microseconds. The output of this reference oscillator 6 is coupled to a flip-flop circuit 7 which is connected as a binary stage to halve the oscillator output frequency. Anti-phase outputs from the flip-flop 7 are applied respectively to diode gating circuits 8 and 9 which also receive output signals from the web pulse generator 1 via the combination of circuit 5 and from the reel pulse generator 2 respectively. The functions of the gating circuits 8 and 9 are equivalent and therefore only that of circuit 9 controlling the reel revolution indicating pulses from the generator 2 will be described. The diode 10 arranged in series with the input of a flip-flop circuit 11 from the reel pulse generator 2 is normally cut off and the diode gate 9 is open. Positive edges from the output of the binary stage 7 will pass through the diode gate 9 when it is open and the first of these signals will reset the flip-flop 11 which will then remain in this condition until the arrival of a pulse at its input via the diode 10. When a reel revolution indicating pulse is generated by the generator 2 the diode 10 conducts to reset the flip-flop circuit 11 and thus switch the potential of its output terminal. The reel revolution indicating pulse of the generator 2 also closes the diode gate 9 so that no further pulses from the binary stage 7 are transmitted to the flip-flop circuit 11 during the duration of the reel pulse. When this pulse terminates the diode gate 9 reopens and the first positive edge from the binary stage 7 sets the flip-flop circuit 11 to return its output terminals to their former condition. The positive edge thus generated on output connection 12 of the flip-flop circuit 11 is applied to a flip-flop circuit 13 controlling the auxiliary counter 4. The web pulse channel comprising diode gate 8, flip-flop circuit 14 and diode 15 functions in an identical manner, but since the positive edges and the two output terminals of the binary stage 7 are separated by an interval of 100 microseconds, the resulting web clock pulses and reel reference pulses at the output terminals of the flip-flop circuit 14 and 11 respectively must always be separated by at least this interval.

The main counter 3 is a conventional reversible counter including eight cascaded binary stages. Web clock pulses from the output of the flip-flop circuit 14 are applied to the diode gate 16 at the input to the main counter 3. The diode gate 16 is opened and closed in response to the condition of the flip-flop circuit 17, but is normally open so that the main counter 3 counts the web clock pulses from the output of the flip-flop circuit 14. Each time the counter 3 reaches a count of 256, which is ambiguous with 0, the AND gate 18 which is connected to each of the binary stages of the counter is operated and fires the pulse shaping circuit 19 which acts as an inverter and booster circuit. The positive output pulse from the pulse shaping circuit 19 is applied to a flip-flop circuit 20 which feeds a twin inverter and amplifier circuit 21, the output of which ensures that the biasing potentials of the counter are such that the counter is operating in the forward direction. If the biasing potentials were such that the counter was already operating in the forward direction there is no further action, but if the potentials indicate that the main counter 3 was previously operating in the reverse mode they are switched over and the resultant output pulse from the counter is applied via the emitter follower circuit 22 to a differentiating, amplifying and inverting circuit 23, the output signal from which forms the delayed reel revolution indicating output pulse for application to the register detector circuit of the splicing mechanism. A further output pulse from the counter is fed back to the flip-flop circuit 17 which then opearates to close the diode gate 16 preventing further web clock pulses being applied to the main counter 3. Thus when the counter reaches zero from its reverse mode, in addition to generating a delayed output pulse, it switches itself off.

The auxiliary counter 4 also includes 8 cascaded binary stages and is gated at its input by a diode gate 24 which is controlled by the condition of the flip-flop circuit 13 in a similar arrangement to that of the input to the main counter 3. Unlike the main counter the auxiliary counter is not reversible, but output signals from its eight binary stages control an AND gate 25 in a similar way to that in which the main counter 3 controls the AND gate 18. The auxiliary counter 4 is normally in its zero condition, but a reel revolution indicating pulse at the output of the flip-flop circuit 11 switches on the auxiliary counter 4 by means of the flip-flop circuit 13 controlling the diode gate 24 and also switches the main counter 3 into its reverse mode. The auxiliary counter 4 then commences to count up to its maximum count of 256 as has been described with reference to the waveform diagram in FIGURE 2 while the count in the main counter 3 is reduced. The main counter will reach zero before the auxiliary counter since its stored count on being switched in to the reversed mode must necessarily be less than its maximum count of 256 and on reaching zero it switches itself off and generates an output pulse as has been described. When the auxiliary counter 4 reaches 256 and resets itself to zero it turns itself off by means of a connection from the output of the counter to the flip-flop circuit 13 which controls the condition of the diode gate 24 and also operates the AND gate 25 which is directly coupled to control the diode input gate 16 to the main counter 3 via a direct coupling to an emitter follower 26 and the flip-flop circuit 17, and cause the main counter to start counting once more in a forward direction if an "in register" condition of the web has not been predicted and the operation of the splicing mechanism initiated.

We claim:

1. In apparatus for sticking a moving web of paper carrying a repeated pattern to a rotating new reel of paper carrying a corresponding pattern and which apparatus also includes a splicing mechanism; a new reel pulse generating means for generating pulses in response to the sensing, in successive revolutions of the new reel, of a register mark on the new reel; expiring web register pulse generating means for generating pulses in response to the sensing of register marks at corresponding positions on the expiring web; a register detector circuit, connected to receive pulses from both the new reel pulse generating means and the expiring web register pulse generating means, and means responsive to the register detector circuit for initiating the operation of the splicing mechanism; the following combination, to form means for delaying in accordance with the speed of movement of the expiring web the application to the register detector circuit of new reel pulses:

web clock pulse generating means adapted to operate in synchronism with the advancement of the expiring web to emit a predetermined number of web clock pulses during the passage of each pattern length on the expiring web past a given point;

means for counting the web clock pulses;

means responsive to the reception of new reel pulses for triggering the counting means into operation, the counting means being so arranged that it contains an indication of the number of web clock pulses generated in the immediately preceding revolution of the new reel during the passage past the given point of the fractional pattern length on the expiring web by which the total length of expiring web passing during the said revolution exceeds an integral number of pattern lengths, and means responsive to the said indication of the counting means for generating a delayed new reel pulse for application to the register detector circuit when the number of web clock pulses received by the counting means after the reception of a new reel pulse is equal to the number of web clock pulses generated during the passage of the said fractional pattern length past the given point.

2. Delay means according to cliam 1, including means responsive to the reception of a new reel pulse for generating a pulse to reverse the mode of operation of the counting means then containing an indication of the number of web clock pulses generated during the passage of the said fractional pattern length on the expiring web past the given point so that in response to the reception of further web clock pulses its count is reduced in unit steps, in which the means for generating a delayed reel revolution pulse is responsive to the reduction of the count in the counting means by a count equal to the count accumulated during the passage of the said fractional length past the given point.

3. Delay means according to claim 2, including means for resetting the counting means to an initial condition upon registration by the counter of a number of web clock pulses which indicate that the complete pattern lengths which pass the given point during a complete revolution of the new reel have passed that point since the reception of the immediately preceding new reel pulse by the counting means so that the counting means upon reversal registers a count equal to the number of web clock pulses generated during the passage of the said fractional pattern length, and including additional means responsive both to the new reel pulses and the web clock pulses for conditioning the counting means to commence counting in a forward direction from an initial condition in response to the reception of web clock pulses when a predetermined integral number of pattern lengths have passed the given point after the generation of each new reel pulse.

4. Delay means according to claim 3, including a main counter and an auxiliary counter, constituting the said counting means, means operating to reset the main counter to an initial condition upon registration by the main counter of a number of web clock pulses which indicate that the number generated since the reception of the immediately preceding new reel pulse is equal to the number generated during the passage of the complete pattern lengths past the given point during each revolution of the new reel; means for applying succeeding web clock pulses to the main counter; means responsive to the reception of a new reel pulse for reversing the mode of operation of the main counter; means responsive to the reception of a new reel pulse for applying succeeding web clock pulses to the auxiliary counter; means responsive to the auxiliary counter for resetting the auxiliary counter when it registers a count equal to the number of web clock pulses generated during the passage of a single completed pattern length past the given point, and means responsive to the said resetting of the auxiliary counter for conditioning the main counter so that it counts succeeding web clock pulses in a forward direction.

5. Delay means according to claim 4 including means responsive to the registration by the main counter of a count equal to the number of web clock pulses generated during the passage of a single complete pattern length past the given point for resetting the main counter.

References Cited by the Examiner

UNITED STATES PATENTS

| | | | |
|---|---|---|---|
| 2,212,812 | 8/1940 | Horton | 242—58.3 |
| 2,536,153 | 1/1951 | Bishop | 242—58.3 |
| 2,599,430 | 6/1952 | Beverman | 318—70 |
| 2,621,865 | 12/1952 | Weiking | 242—58.3 |
| 2,655,994 | 10/1953 | Vandenberg | 318—158 |
| 2,716,450 | 8/1955 | Nicholson | 318—6 |
| 2,899,143 | 8/1959 | Crosfield et al. | 242—58.3 |
| 3,042,332 | 7/1962 | Astley | 242—58.3 |

FOREIGN PATENTS

| | | |
|---|---|---|
| 798,330 | 7/1958 | Great Britain. |

MERVIN STEIN, *Primary Examiner.*